Dec. 9, 1930.    E. W. HEISEY    1,784,232
ICE RECEPTACLE
Filed Sept. 8, 1928

INVENTOR.
Edgar W. Heisey
BY
ATTORNEYS.

Patented Dec. 9, 1930

1,784,232

UNITED STATES PATENT OFFICE

EDGAR WILSON HEISEY, OF NEWARK, OHIO, ASSIGNOR TO A. H. HEISEY & COMPANY, OF NEWARK, OHIO, A PARTNERSHIP

ICE RECEPTACLE

Application filed September 8, 1928. Serial No. 304,829.

My invention relates to ice receptacles. It has to do particularly with that type of article frequently referred to as an ice tub and used for the transportation of cracked ice, ice cubes, et cetera.

One of the objects of my invention is to provide an ice receptacle which comprises a container portion formed of glass and a handle structure which is readily attachable to the container portion in such a manner as to minimize the strains incident to the connection of the container and the handle structure.

Another object of my invention is to produce a container structure of glass having lugs integrally formed thereon. These lugs are not only integrally formed but they are provided with specially shaped and reenforced apertures designed for cooperation with a specially shaped and reenforced connecting bolt structure which forms a part of the handle structure of my device.

More specifically, my invention comprises a container structure of glass having integral apertured lugs. These lugs preferably have their apertures formed on a taper and provided with a reenforcing annular lip at the bottom thereof. The handle structure preferably comprises a bowed member whose ends are pivotally connected to the L-shaped heads of bolts having tapered shanks which are adapted to be disposed with a wedging action in the apertures of the lugs.

The preferred embodiment of my invention is shown in the accompanying drawings wherein similar characters of reference designate corresponding parts and wherein.

Figure 1:
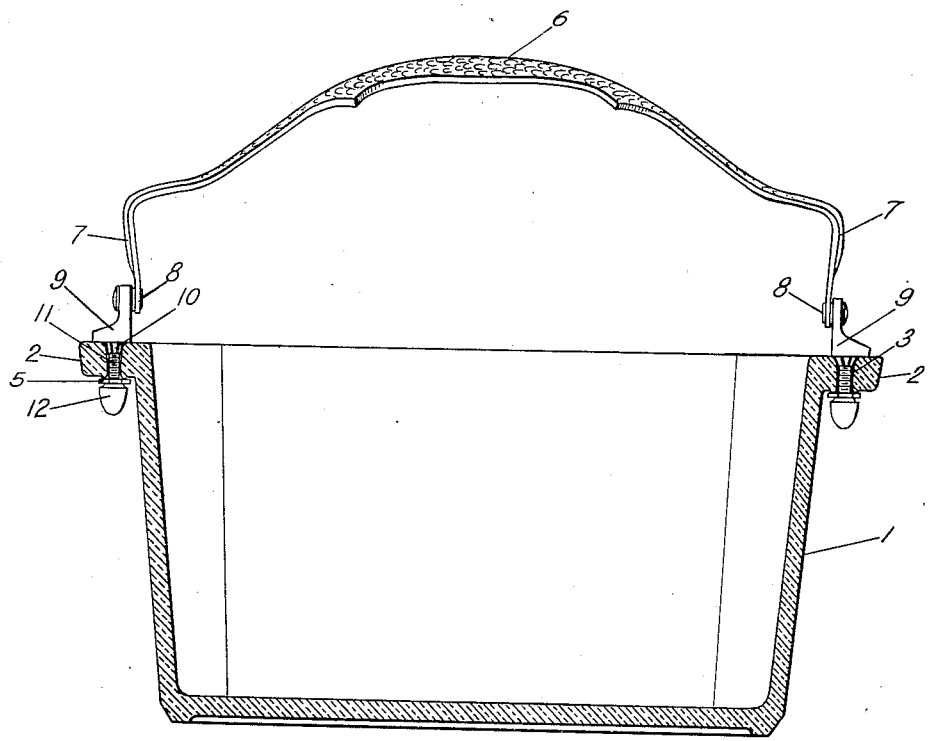
Figure 1 is a vertical longitudinal section taken through the center of my ice receptacle.

In the drawings, I have shown my invention as comprising an ice container 1. This ice container is preferably formed from a single piece of glass and is provided on its longitudinal ends with oppositely extended lugs 2.

Figures 2, 3:
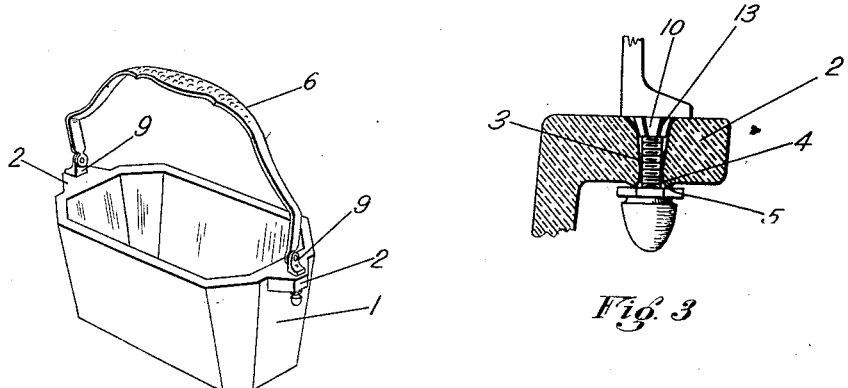
Figure 2 is a perspective view of my ice receptacle.
Figure 3 is a detail in section illustrating my lug structure and the manner of connecting the handle thereto.

The lugs 2 of the container take the form of members which are more or less triangular and connected to the container integrally by broad bases. Each lug is preferably provided with an aperture 3 which is flared at its upper end and which tapers downwardly toward its lower end. It is also flared outwardly at its lower end as shown at 4 in Figure 3. Concentric with the lower end of the aperture and projecting downwardly therefrom is an annular reenforcement 5 which is integrally formed with the body of the lug.

The handle structure of my device preferably comprises a bowed member 6 having down-turned legs 7. These down-turned legs 7 are provided at their lower ends with pivot pins 8 which serve to pivotally connect the downwardly extending legs to L-shaped heads 9 of the bolt structures which form a means of connection between the handle ends and the lugs.

The bolt structures have their L-shaped heads provided with flat underneath surfaces that are adapted to rest upon the flat upper surfaces of the lugs. Centrally depending from these flat underneath surfaces of the L-shaped heads, are bolt shanks which are formed with flared portions 10 adjacent their upper ends and with threaded lower extremities 11 adapted for the reception of nuts 12. The flared portions 10 are preferably provided with integral vertical ribs 13.

In assembling my structure, the shanks of the bolt structures are introduced downwardly into the apertures of the lugs and are caused to project below the bottom surfaces of these lugs. The handle 6 is preferably of such a structure that the downwardly extending legs 7 thereof exert a spreading force which is transmitted to the bolt structures and tends to hold them firmly against the outer walls of the lug apertures. The nuts 12 are then applied to the threaded extremities of the shanks of the bolt structures and are tightened to draw the ribs 13 of the flared portions 10 of these shank structures firmly into contact with the upper flared part of the lug aperture. At the same time, the nuts 12 seat themselves firmly against the annular reenforcements 5 on the under surfaces of the lugs.

It will be seen that I have provided an ice receptacle having numerous advantages. In the first place, the container, although of glass, is of substantial construction and the location of the lugs with their upper surfaces in the same plane as the upper surfaces of the edges of the container further enhances the substantial character of this container. Furthermore, the bolt and nut connection with the lugs is of such form that danger of strain and breakage, due to connection of metal with glass, is reduced to a minimum. In the first place, the flared portion of the shank structure and, particularly, the vertical ribs thereof, bear against the walls of the aperture in such a manner that the pressures thereby produced are transmitted laterally, rather than downwardly, toward the nut. Likewise, these vertical ribs are of relatively soft metal and this further minimizes the strain on the glass. Furthermore, the nuts flare directly against the annular reenforcements 5 and the clearance produced by the lower flares of the aperture precludes all danger of the threaded portions of the shank being forced against the walls of the lug apertures with undue pressure. Other advantages of my structure will be obvious from the foregoing description.

Having thus described my invention, what I claim is:

1. An ice receptacle comprising a glass container with lugs integrally formed thereon and having flared apertures therein and a handle structure comprising bolts adapted to fit in said apertures, said bolts having flared portions.

2. An ice receptacle comprising a glass container with lugs integrally formed thereon and having flared apertures therein, and a handle structure comprising bolts adapted to fit in said apertures, said bolts having flared portions with ribs formed thereon.

3. An ice receptacle comprising a glass container with lugs integrally formed thereon and having flared apertures therein, integral reenforcing rib structures carried on the lower surfaces of said lugs, a handle structure comprising bolts adapted to fit in said apertures and nuts threaded upon said bolts and bearing against said integral reenforcing rib structure.

4. An ice receptacle comprising a glass container with lugs integrally formed thereon and having flared apertures therein, integral reenforcing rib structures carried on the lower surfaces of said lugs, a handle structure comprising bolts adapted to fit in said apertures, said bolts having shanks with flared portions thereon and with vertical ribs on said flared portions, and nuts threaded upon said bolts and bearing against said integral reenforcing rib structures, said nuts serving to draw the flared portions of said bolt shanks downwardly into firm contact with the interior walls of the flared portions of said apertures.

In testimony whereof I hereby affix my signature.

EDGAR WILSON HEISEY.